(12) United States Patent
Green et al.

(10) Patent No.: US 10,001,078 B2
(45) Date of Patent: Jun. 19, 2018

(54) ENGINE COOLING SYSTEM

(71) Applicant: DEERE & COMPANY, Moline, IL (US)

(72) Inventors: Gerald W. Green, Cedar Falls, IA (US); Richard R. Winsor, Waterloo, IA (US); Douglas S. Brocco, Waterloo, IA (US); Craig W. Lohmann, Denver, IA (US); Alok N. Pandey, Cedar Falls, IA (US); Clifford Arnold, Earlysville, VA (US)

( * ) Notice: Subject to any disclaimer, the term of this patent is extended or adjusted under 35 U.S.C. 154(b) by 807 days.

(21) Appl. No.: 14/493,177

(22) Filed: Sep. 22, 2014

(65) Prior Publication Data

US 2016/0084194 A1    Mar. 24, 2016

(51) Int. Cl.
| | |
|---|---|
| F02B 75/18 | (2006.01) |
| F02F 1/40 | (2006.01) |
| F02F 1/42 | (2006.01) |
| F01P 3/02 | (2006.01) |

(52) U.S. Cl.
CPC .............. F02F 1/40 (2013.01); F02F 1/4235 (2013.01); F02F 1/4264 (2013.01); *F01P 2003/024* (2013.01); *Y02T 10/146* (2013.01)

(58) Field of Classification Search
CPC ...................... F02F 1/40; F02F 1/14
USPC ........................ 123/41.74, 41.82 R
See application file for complete search history.

(56) References Cited

U.S. PATENT DOCUMENTS

| | | | |
|---|---|---|---|
| 4,653,761 A | 3/1987 | Baugh et al. | |
| 4,889,080 A * | 12/1989 | Oguri | F02F 1/40 |
| | | | 123/41.31 |
| 2005/0257756 A1* | 11/2005 | Endoh | F01P 3/02 |
| | | | 123/41.79 |
| 2009/0301429 A1* | 12/2009 | Takashina | F02B 67/06 |
| | | | 123/197.5 |
| 2010/0300100 A1* | 12/2010 | Harmon, Sr. | F01B 7/20 |
| | | | 60/645 |
| 2013/0340703 A1* | 12/2013 | Jones | F02F 1/242 |
| | | | 123/193.5 |

FOREIGN PATENT DOCUMENTS

| | | |
|---|---|---|
| DE | 102010027104 A1 | 1/2012 |
| JP | 2000310157 A | 11/2000 |

OTHER PUBLICATIONS

European Patent Office, Extended European Search Report in Application No. 15182098.2 dated Feb. 2, 2016.

* cited by examiner

*Primary Examiner* — Marguerite McMahon
*Assistant Examiner* — James Kim
(74) *Attorney, Agent, or Firm* — Lorenz & Kopf, LLP

(57) ABSTRACT

A cooling jacket is formed at least in part within the cylinder head mounted on an engine block defining one or more piston cylinders and one or more intake and exhaust ports in communication with each piston cylinder. The cooling jacket includes a first passageway, a second passageway and a turbulence chamber. The first passageway extends from a first flow passage and intersects the turbulence chamber at a first angular position, and the second passageway extends from a second flow passage and intersects the turbulence chamber at a second angular position different from the first angular position. A swirling action is imparted to fluid media passing through the turbulence chamber.

17 Claims, 15 Drawing Sheets

ENGINE COOLING SYSTEM

CROSS-REFERENCE TO RELATED APPLICATION(S)

Not Applicable.

STATEMENT REGARDING FEDERALLY SPONSORED RESEARCH

Not Applicable.

FIELD OF THE DISCLOSURE

This disclosure relates to an engine cooling system and more particularly to a cooling jacket configuration that alters the dynamics of the coolant flowing therein.

BACKGROUND OF THE DISCLOSURE

In general, effective heat transfer is a key component of many powered systems such as refrigeration systems, electronic systems including processors, or systems powered by an internal combustion engine. In the example case of vehicles powered by an internal combustion engine, one of the major causes of engine failure or poor performance may result from over-heating. Internal combustion engines operate, in part, by burning a fuel source to generate mechanical energy (e.g., horsepower, hp), combustion products in the form of exhaust gasses and heat. The mechanical energy produced by the engine may be used to power a process or device such as a driveshaft for turning the wheels of the vehicle. However, the exhaust gasses and excess heat produced by the engine must also be accounted for.

An engine may include various ports in fluid communication with the combustion chambers for routing exhaust gasses away from the engine. The engine may further include a cooling system such as a cooling jacket in order to facilitate heat transfer away from the various components of the engine. A fluid such as an engine coolant may be directed through the cooling jacket to provide cooling to the features of the engine, such as the one or more cylinders, intake and exhaust ports, valve guide features, valve seats, piston rings, and the combustion deck. The cooling system may prevent damage to the components of the engine and associated lubricants and ultimately, prevent failure of the engine.

A cooling jacket is generally designed to accommodate the heat transfer needs of a given engine. For example, a 150 hp engine may require a given rate of cooling, and a cooling jacket may be designed accordingly. In certain situations, it may be useful to increase the power output of a given engine. However, an increase in power generally correlates with an increase in the amount of heat produced by the engine. Therefore, a cooling system may be modified to provide for an enhanced heat transfer capacity. For example, the volume and/or rate at which the coolant flows through the cooling jacket may be increased. However, this may lead to an increased load on the water pump due to an increased pressure drop. The location of the cooling jacket or the direction of flow also may be varied. While this approach may enhance heat transfer, the complex shape of the cooling jacket is constrained by factors including the shape of the cylinder head and the optimal temperature at which the engine is operated. An overly large cooling jacket may increase heat transfer but at the cost of extra weight to be transported by the vehicle carrying the engine.

Accordingly, there is a need for a cooling system having an enhanced heat transfer capacity for removing heat from an engine. More broadly, there is a need for a system and method for providing an enhanced heat transfer system for heating or cooling one or more components of a device.

SUMMARY OF THE DISCLOSURE

In an engine having an engine block and a cylinder head mounted on the engine block defining one or more piston cylinders and one or more intake and exhaust ports in communication with each piston cylinder, the present disclosure provides a cooling jacket formed at least in part within the head, including a first passageway, a second passageway, and a turbulence chamber disposed about a chamber axis. The turbulence chamber has a first inlet opening at a first angular position, a second inlet opening at a second angular position different from the first angular position, and an outlet opening positioned about the chamber axis. The first passageway extends from a first flow passage and intersects the turbulence chamber at the first inlet opening and the second passageway extends from a second flow passage and intersects the turbulence chamber at the second inlet opening. At the turbulence chamber a swirling action is imparted to fluid media exiting the turbulence chamber through the outlet opening.

In another aspect the disclosure provides a work vehicle, including an engine having an engine block and a cylinder head mounted on the engine block defining one or more piston cylinders and one or more intake and exhaust ports in communication with each piston cylinder. The work vehicle further includes a cooling jacket formed at least in part within the head including a first passageway, a second passageway and a turbulence chamber. The first passageway extends from a first flow passage and intersects the turbulence chamber at a first angular position, and the second passageway extends from a second flow passage and intersects the turbulence chamber at a second angular position different from the first angular position. At the turbulence chamber a swirling action is imparted to fluid media passing therethrough.

In an engine having an engine block and a cylinder head mounted on the engine block defining one or more piston cylinders and one or more intake and exhaust ports in communication with each piston cylinder, the present disclosure provides a cooling jacket formed at least in part within the head, including a turbulence chamber disposed about a chamber axis. The turbulence chamber has an interior deflection surface, an inlet opening at a first angular position about the chamber axis. The inlet opening and at least a portion of the deflection surface are spaced apart on opposite sides of the chamber axis along an inlet flow axis spaced from the chamber axis. The turbulence chamber further includes an outlet opening positioned about the chamber axis. The cooling jacket further includes an inlet passageway providing fluid media to the turbulence chamber through the inlet opening, and an outlet passageway receiving fluid media from the turbulence chamber through the outlet opening. Fluid media entering the turbulence chamber through the inlet opening is redirected by the portion of the deflection surface within the turbulence chamber along a path at an angle to the inlet flow axis such that a swirling action is imparted to the fluid media exiting the turbulence chamber through the outlet opening.

These and other aspects and advantages of the cooling system disclosed herein will become better understood upon consideration of the detailed description of the drawings.

BRIEF DESCRIPTION OF THE DRAWINGS

Like reference numerals will be used to refer to like parts from figure to figure in the following detailed description.

DETAILED DESCRIPTION

Figure 1:
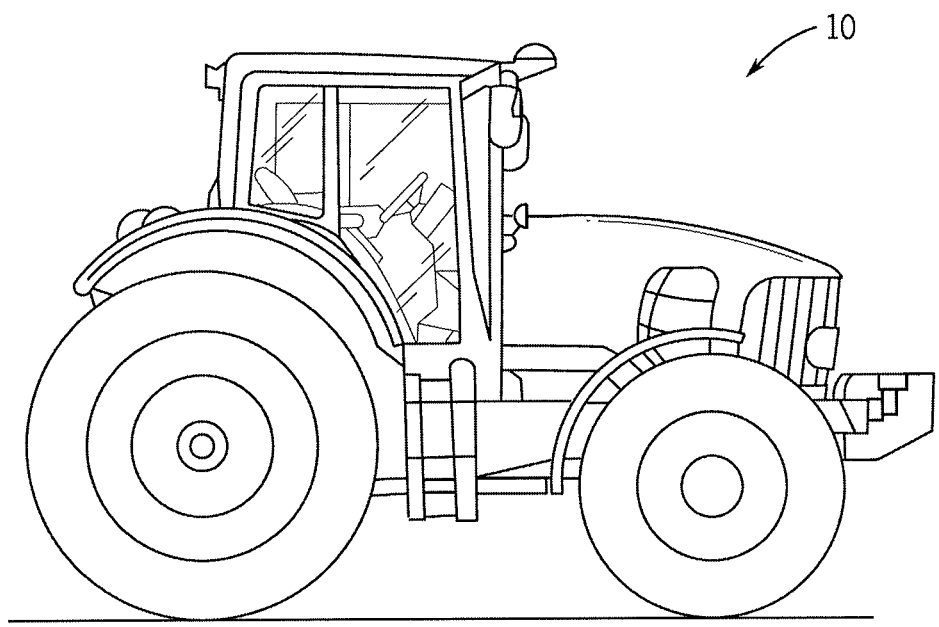
FIG. 1 is a side view of an example work vehicle including an engine cooling system according to the present disclosure.

As discussed above, in various situations it may be useful to provide a heat transfer system for heating or cooling one or more components of a device. For example, it may be useful to form a cooling system for an engine. The cooling system may include a cooling jacket, such as a water jacket, having a plurality of passageways within an engine block or a cylinder head for cooling the engine. An engine coolant may be directed through the flow passages in order to transfer heat from components of the engine, such as the cylinders, intake and exhaust ports, valve guide features, valve seats, piston rings, or the combustion deck, during operation of the engine. In order to provide a flow path for the engine coolant, the one or more passageways may be formed in proximity to areas that experience a greater heat load or "hot spots" within the engine. However, the design of such features may be constrained due to factors such as the dimensions or operating parameters of the engine. Moreover, the flow rate of the engine coolant through the passages may be limited due to the capacity of the water pump or limitations imposed by other components of the cooling system. In one aspect, insufficient cooling by the cooling system may result in degradation of lubricants or the various components of the engine, which may lead overall failure of the engine. Various other problems may also arise as requirements for heat transfer become more exacting.

Use of the disclosed cooling system may address these and other issues. For example, a design for a cooling jacket may include one or more turbulence-inducing features to enhance the velocity profile of a fluid flowing through the cooling jacket. The resulting changes may lead to more even heat transfer, greater heat transfer capacity, or enhanced heat transfer in general as compared with designs lacking one or more features according to the present disclosure. In one aspect, the turbulence-inducing features may be configured to increase the velocity of a fluid flow at a particular spatial location within a portion of the cooling jacket. In another aspect, the turbulence-inducing features may be configured to alter the flow direction or to set up a particular flow pattern within a portion of the cooling jacket. For example, it may be useful to impart a circular or vortical flow to a fluid traveling within a portion of the cooling jacket. In yet another aspect, it may be useful to convert a laminar flow profile to a turbulent flow profile or further enhance a turbulent flow profile. In general, aspects of the aforementioned design of a cooling system may be used to increase the velocity of a fluid in portions of the cooling jacket that are proximate to locations of high heat production, near components that are particularly sensitive to high heat or near portions of the engine where heating may lead to failure of the component if there is inadequate heat transfer. Examples of such locations in the case of an internal combustion engine may include the areas proximate to the one or more exhaust ports and proximate to the combustion deck in general.

In one example, a cooling jacket may include a turbulence generator with a first passageway and a second passageway that intersect at a turbulence chamber. The first and second passageways may each be in communication with respective flow passages of the cooling jacket. Moreover, the first and second passageways may intersect with the turbulence chamber at a given angle or angular position in order to impart a swirling action or vortical motion to a fluid in the turbulence chamber. In one aspect the swirling action may be applied to improve heat transfer locally. For example, the turbulence chamber may be positioned proximate to a component where it may be useful to provide enhanced heat transfer. In another aspect, a swirling action may be imparted to a fluid flowing through a cooling jacket in order to achieve a global effect such as at a downstream location. For example, a turbulence chamber for imparting a vortical flow to a fluid may be in upstream communication with a fluid passage that passes proximate to a location where it may be useful to provide enhanced heat transfer capabilities. Accordingly, the fluid passing through the downstream passage may retain at least a portion of the circular motion imparted by the turbulence chamber in order to provide the enhanced heat transfer effect.

In another aspect, a cooling jacket may include one or more turbulence chambers or turbulence generators spaced apart at various locations within the cooling jacket. For example, a cooling jacket may include a central flow passage and a peripheral flow passage orbiting, or disposed about, the central flow passage. The central flow passage and the peripheral flow passage may be in fluid communication by way of one or more radial or bridge passages. In some embodiments, the peripheral flow passage may include one or more turbulence chambers. The bridge passages may intersect with the peripheral flow passage at the turbulence chambers. Accordingly, fluid flowing into the turbulence chambers may retain a vortical motion as it travels into the one or more of the bridge passages in the direction of the central passage. In other embodiments, the one or more bridge passages may include turbulence generators or flow guides. For example, a bridge passage may include a longitudinal cross-section having an upper wall with a convex profile projecting towards an interior of the chamber and a lower wall opposed to the upper wall having a linear profile. The combination of curved and straight walls may guide the flow of a fluid passing through the bridge passage, increase the relative amount of turbulence within the bridge passage or at a downstream location within the cooling jacket, and increase the velocity of a fluid at a particular location within the bridge passage. In some embodiments, the circular motion imparted to a fluid flowing through the cooling jacket may both raise the peak heat transfer rate and provide enhanced heat transfer over a greater surface area of the walls of the cooling jacket. The resulting alteration of the fluid dynamics may correlate with enhanced heat transfer for components proximate to the cooling jacket.

In some embodiments, a cooling system may include a cooling jacket formed at least partially within an internal combustion engine. A cylinder head may be mounted on an engine block defining one or more piston cylinders. The cylinder head may include one or more intake and exhaust ports in communication with the cylinders formed in the engine block. The cooling jacket may be formed at least in part within the cylinder head such that one or more passages of the cooling jacket are formed in close proximity to features of the engine where it may be useful to provide heat transfer. In one example, the passages of the cooling jacket may be made to pass around or between the one or more intake and exhaust ports. In another example the cooling jacket may include a lower deck including passages formed proximate to the interface of the engine block and the cylinder head, and an upper deck formed distal to the interface. The lower deck may include one or more of the aforementioned flow guides, turbulence chambers or turbulence generators in order to provide enhanced heat transfer for components of the cylinder head proximate to the interface.

One particular example of an internal combustion engine where it may be useful to provide a cooling system according to the present disclosure may include a four port type cylinder design. The cylinder head may include two exhaust ports and two intake ports associated with each of the cylinders. The cooling jacket may include various turbulence chambers, flow guides and turbulence generators to provide enhanced heat transfer, such as between the two exhaust ports or between an exhaust port and an adjacent intake port near the combustion deck. Further embodiments of the present disclosure may be understood with reference to the following examples shown in the drawings.

Figure 2:
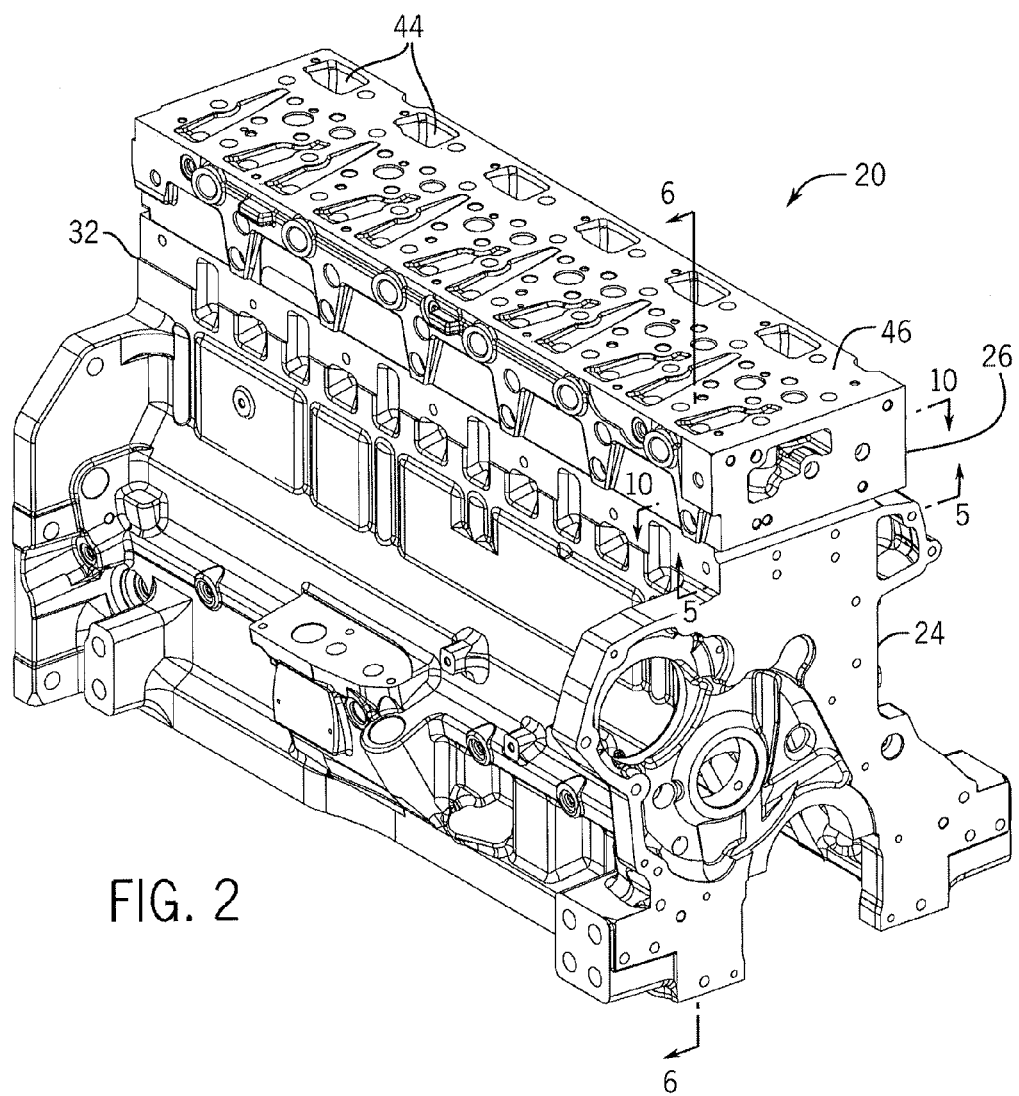
FIG. 2 is a perspective view of the engine of the work vehicle of FIG. 1.
Figure 3:
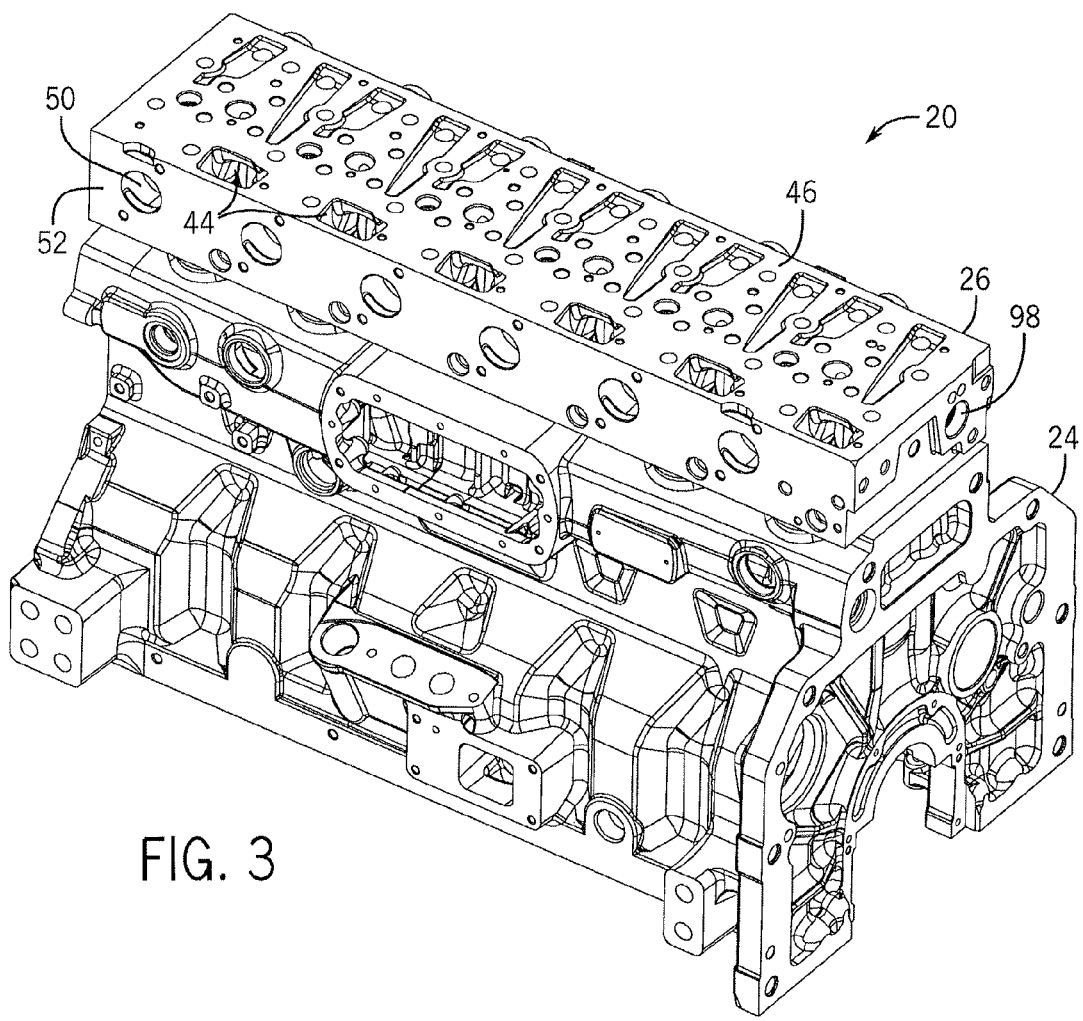
FIG. 3 is a rear perspective view thereof.

A cooling system according to the present disclosure may be suitably employed for heating or cooling of any component or device with a fluid (i.e., gas, liquid, plasma) or other flowable medium guided through a pipe, conduit, channel or other shaped passageway. In one particular embodiment, a cooling system may be incorporated into a work vehicle 10 as shown in FIG. 1. Work vehicle 10 may take the form of an agricultural vehicle such as a tractor or harvester. However, a cooling system may be suitably incorporated into another class of work vehicle such as a construction vehicle, a recreational vehicle, a passenger vehicle or the like. Work vehicle 10 may include an internal combustion engine 20 as shown, for example, in FIGS. 2-3 for powering one or more components of the work vehicle 10. In one aspect, engine 20 may power a drive shaft to provide a torque for turning one or more wheels, belts, fans, or other components of the work vehicle 10.

Engine 20 is illustrated as a six-cylinder diesel engine with each of the cylinders 22 (see FIGS. 4-6) oriented along parallel axes in a straight, in-line configuration. However, other engine types (e.g., gasoline, jet, electric) and designs (e.g., V, flat, rotary) may also be compatible with a cooling system according to the present disclosure. The engine 20 includes an engine block 24 and a cylinder head 26 mounted to the engine block 24. The engine block 24 may include features such as ports, cavities, passageways and the like for accommodating a crankshaft, flywheel, gearbox, connecting rod or other components for supporting operation of the engine 20. In one aspect, the cylinders 22 are formed in the engine block 24 and have a cylindrical construction shaped to accommodate reciprocating pistons (not shown). The cylinders 22 may be open to a primary face 28 of the engine block 24.

The cylinder head 26 may be mounted to the engine block 24 with a primary face 30 of the cylinder head 26 opposing the primary face 28 of the engine block 24, thereby forming an interface 32. In some embodiments, an interface 32 may include a gasket or other device (not shown) for providing a seal between the engine block 24 and the cylinder head 26. The cylinder head 26 may include one or more passages, ports, cavities or other like feature for accommodating components, such as for providing fuel and air to the cylinders 22 or for removing combustion products or other exhaust gasses from the cylinders 22. When a piston head is positioned in one of the cylinders 22, the space between the piston head and the primary face 28 of the engine block 24 may define a combustion chamber. In one aspect, the portion of the primary face 30 of the engine block 24 disposed over the opening of a cylinder 22 may define at least a portion of the combustion deck.

Figure 4:
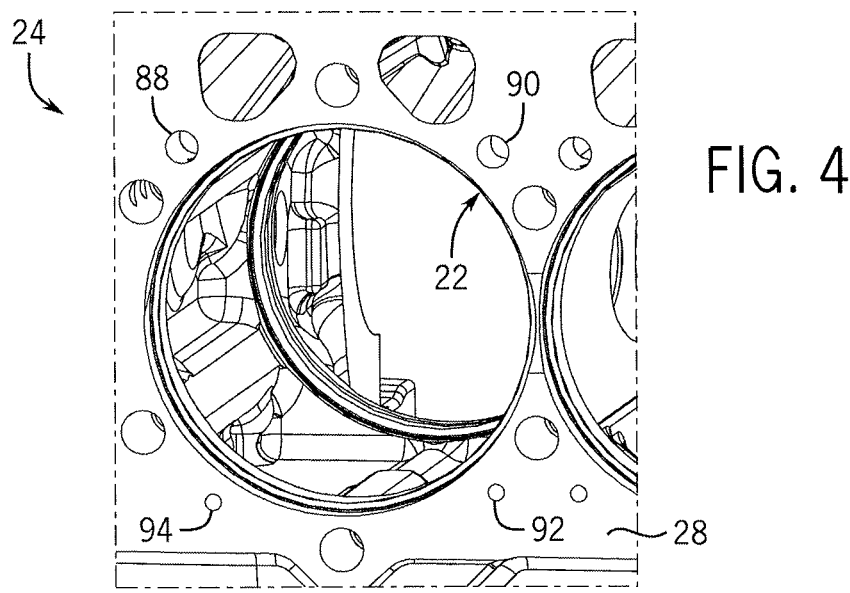
FIG. 4 is a partial perspective view of a cylinder of the engine block with the cylinder head omitted for clarity.
Figure 5:
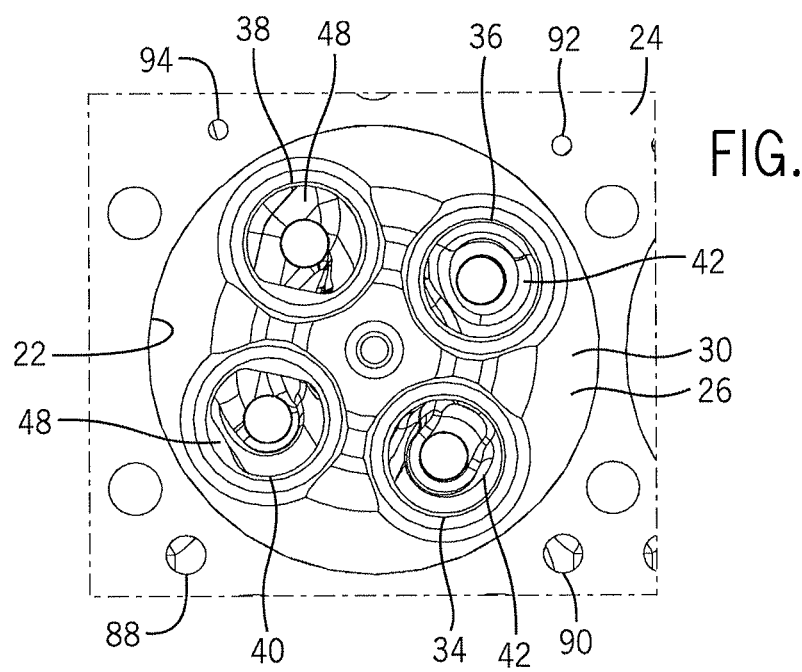
FIG. 5 is a partial cross-sectional plan view of the intake and exhaust ports formed in the cylinder head and associated with the cylinder of FIG. 4 as taken along line 5-5 of FIG. 2.

With reference to FIGS. 4 and 5 at least, for each cylinder, the cylinder head 26 may include a first intake port 34, a second intake port 36, a first exhaust port 38, and a second exhaust port 40. The first intake port 34 and the second intake port 36 may extend between openings 42 in the primary face 30 and an opening 44 in opposing face 46 of the engine block 24. Accordingly, the first intake port 34 and second intake port 36 may provide a source of air or fuel to a combustion chamber of a corresponding cylinder 22 during operation of the engine 20. By comparison, the first exhaust port 38 and second exhaust port 40 may extend between openings 48 in the primary face 30 and an opening 50 in side wall 52 of the cylinder head 26. The first exhaust port 38 and the second exhaust port 40 may therefore provide a pathway for combustion products and other exhaust material to travel away from a combustion chamber of a corresponding cylinder 22 during operation of the engine 20. As shown at least in FIG. 5, openings 42 and opening 48 may include a bevel in order to accommodate additional components of the engine 20 such as valve seats or valve stems (not shown).

During operation of the engine 20, a fuel such as a diesel composition may be combined with oxygen or air in a combustion chamber of a cylinder 22. The composition may then be ignited to initiate a combustion reaction for generating mechanical energy, exhaust material and heat. Heat produced during operation of the engine 20 may be removed from the engine 20 through the use of a cooling system according to the present disclosure. As partially illustrated in isolation in FIGS. 7-9, the cooling system may include a cooling jacket 60 for transporting a fluid such as an engine coolant composition in proximity to various components of the engine. The cooling jacket 60 may include various passageways formed, at least in part, in portions of the engine block 24 or cylinder head 26. In one aspect, the passageways may be integrally cast within the body of the engine block 24 and/or cylinder head 26. However, it may also be possible to provide the passageways by machining one or more portions of the engine 20.

The cooling jacket 60 may include a lower deck 62 proximate to the interface 32 and an upper section 64 in fluid communication with the lower deck 62 and distal to the interface 32. The lower deck 62 may include a plurality of orifices 66, 68, 70 and 72 that may form an opening between the primary face 30 of the cylinder head 26 and nodes 67, 69, 71 and 73 of the lower deck 62, respectively. When the cylinder head 26 is assembled with the engine block 24, the orifices 66, 68, 70 and 72 may be in fluid communication with portions of the cooling jacket 60 formed in the engine block 24. Accordingly, engine coolant flowing through the cooling jacket 60 may pass between the engine block 24 and cylinder head 26 of the engine 20.

Figure 8:
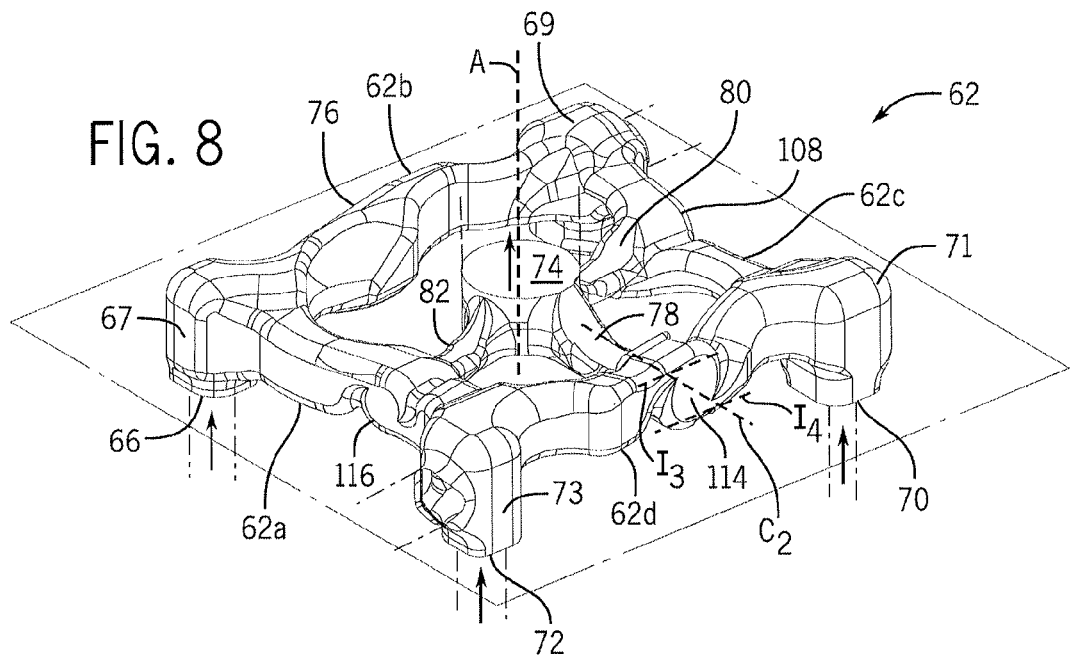
FIG. 8 is an enlarged partial perspective view of a lower deck of the cooling jacket of FIG. 7.
Figure 9:
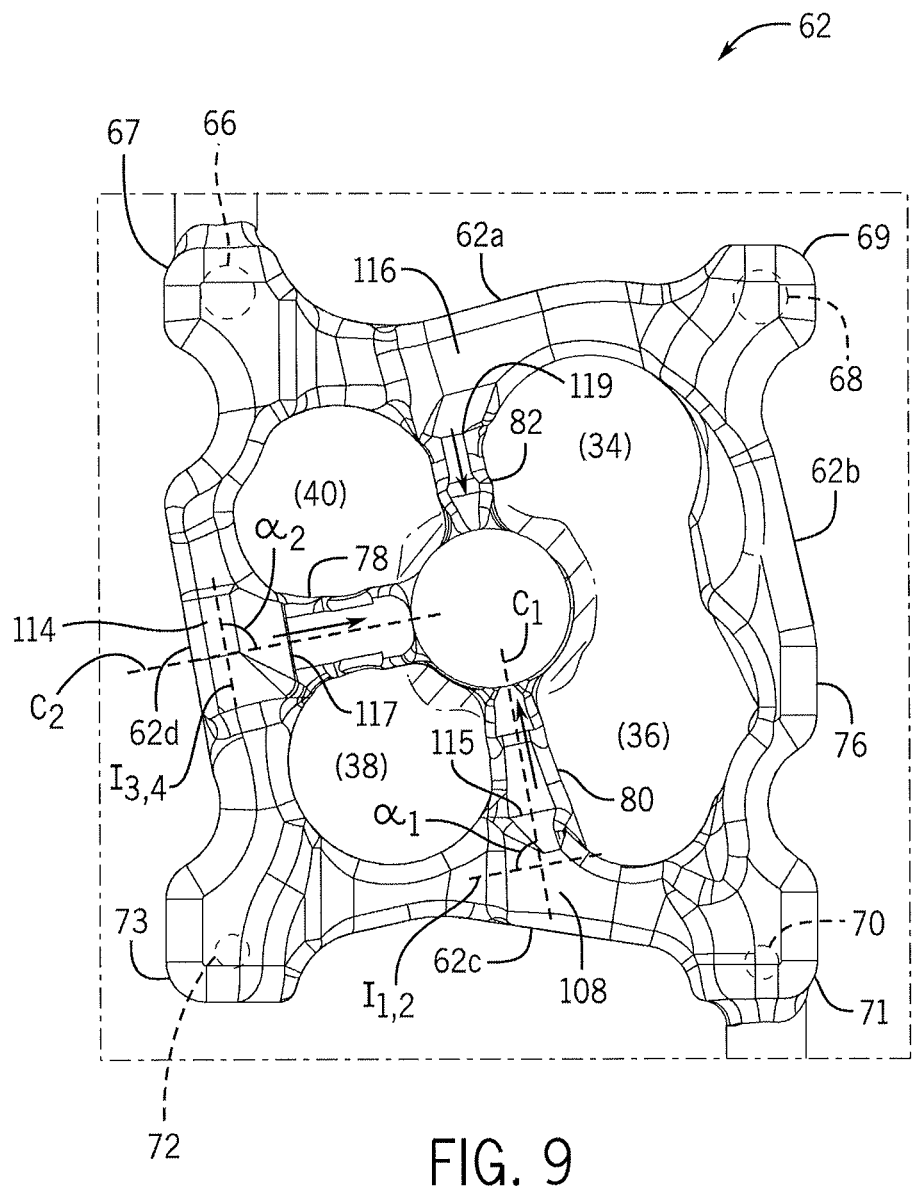
FIG. 9 is a plan view thereof.
Figure 10:
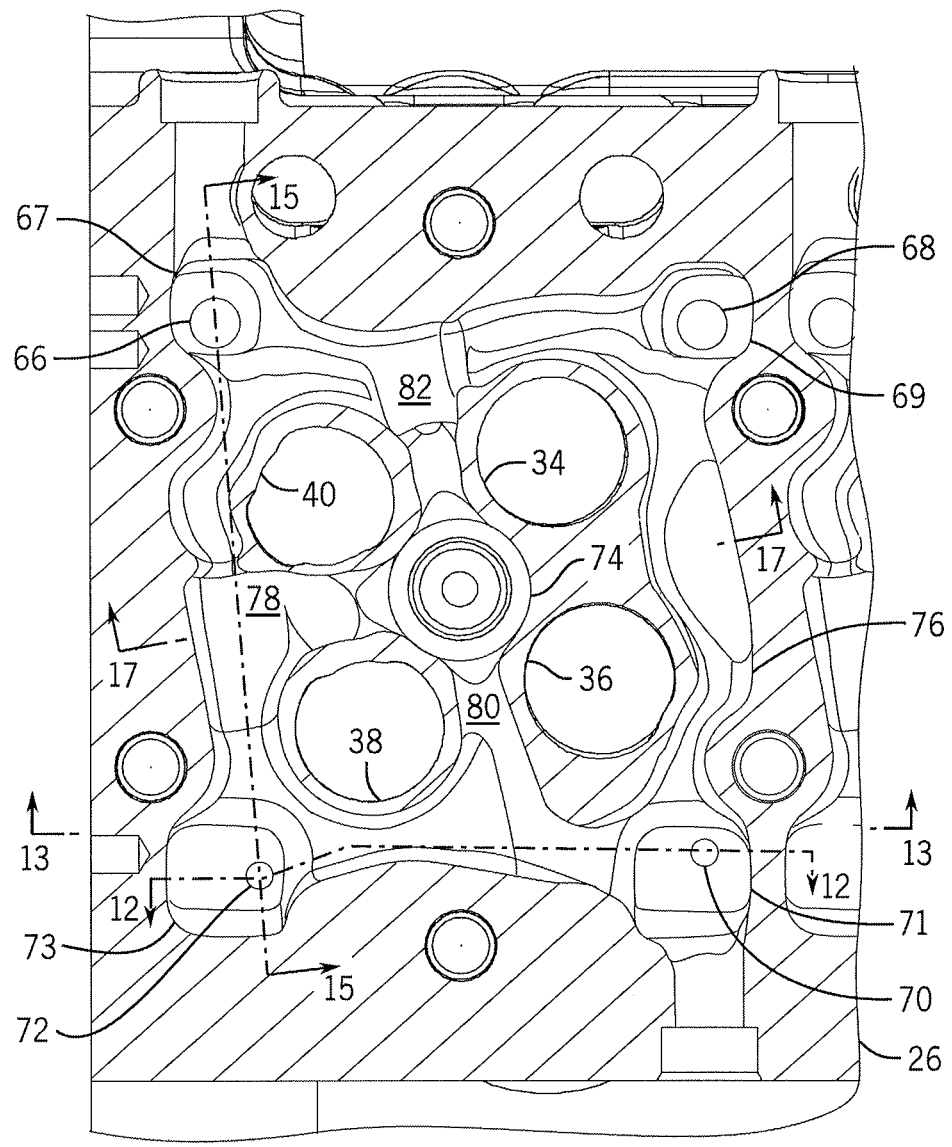
FIG. 10 is partial cross-sectional view of the lower deck of the cooling jacket as taken along line 10-10 of FIG. 2.

As shown in FIGS. 8-10, the lower deck 62 of the cooling jacket 60 may include a central passage 74, which is shown as extending along a generally upright axis, A, between the lower deck 62 and the upper deck 64. The lower deck 62 may further include a peripheral passage 76 disposed around the central passage 74. In one aspect, the peripheral passage 76 may generally reside in plane orthogonal to the upright axis, A. In another aspect, the peripheral passage 76 may be in fluid communication with the central passage 74 by way of one or more radial or bridge passages 78, 80 and 82. As shown at least in FIG. 10, a first bridge passage 78 may be located between the first exhaust port 38 and the second exhaust port 40, a second bridge passage 80 may be located between the first exhaust port 38 and the second intake port 36, and a third bridge passage 82 may be located between the second exhaust port 40 and the first intake port 34. Note that words of direction or orientation are used by way of illustration with respect to embodiments of the present disclosure as shown in the Figures. Words such as "upper", "lower", "upright", and so forth are not intended to limiting and the relative location, orientation or direction of a component of a flow path may vary depending on the particular implementation of an embodiments.

In one aspect, the first exhaust port 38 and the second exhaust port 40 may be relied upon for the transport of hot exhaust gasses from the combustion chamber of a cylinder 22. As a result it may be useful to provide enhanced heat transfer at or near portions of the cylinder head 26 surrounding the openings 42. By comparison, material (e.g., air, fuel) passing through the first intake port 34 and the second intake port 36 are relatively cooler than the hot exhaust gasses. Therefore, it may be useful to omit a bridge passage between the first intake port 34 and the second intake port 36.

In one aspect, minimizing the volume of a cooling jacket 60 may reduce the amount of engine coolant required to be carried by the vehicle. In another aspect, limited use of additional passages in the design of a cooling jacket 60 may concentrate the engine coolant at particular locations within the engine 20, reduce the residence time of engine coolant within the cooling jacket 60, or enable the engine coolant to flow in a desired manner without the need for additional flow guides, inlets, outlets or other plumbing. Each of the aforementioned features may contribute to enhanced heat transfer associated with a cooling jacket according to the present disclosure.

Figure 7:
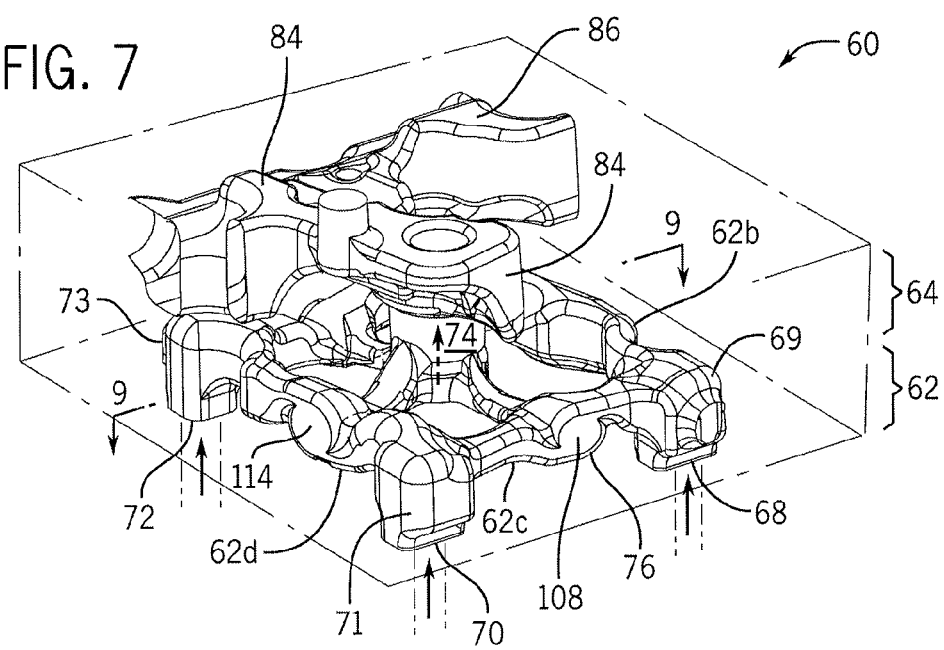
FIG. 7 is an enlarged partial perspective view of a cooling jacket of the engine of FIG. 2 in isolation.
Figure 11:
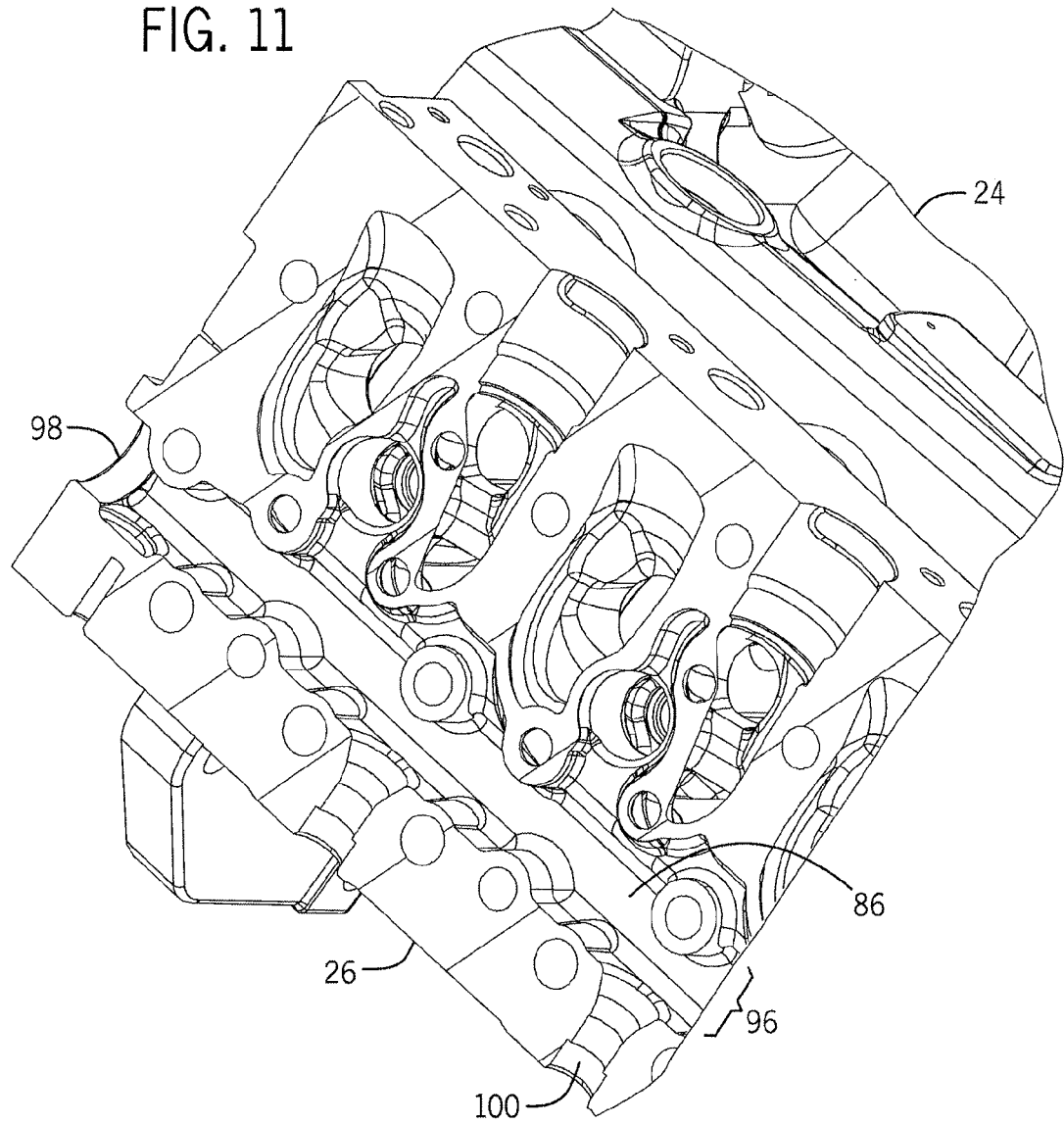
FIG. 11 is a partial cross-sectional perspective view of the engine of FIG. 2 showing the collection log and upper deck of the cooling jacket.

With reference to FIGS. 7 and 11, the upper deck 64 of cooling jacket 60 may include a first section 84 that is generally disposed about a downstream portion of the first exhaust port 38 and second exhaust port 40 that is distal to the interface 32. The upper deck 64 may further include a second section or collection chamber 86. The collection chambers 86 of portions of the cooling jacket 60 associated with adjacent cylinder 22 may be in fluid communication. It will be noted that the upper deck 64 of the cooling jacket 60 may not include passages positioned proximate to upstream portions of the first intake port 34 or second intake port 36. In one aspect, and as also described above, it may not be useful to cool the first intake port 34 or second intake port 36 as the intake gasses may be generally cooler than the exhaust gasses. In another aspect, omitting fluid passages near the first intake port 34 or second intake port 36 may reduce the overall volume or complexity of the cooling jacket 60.

Figure 6:
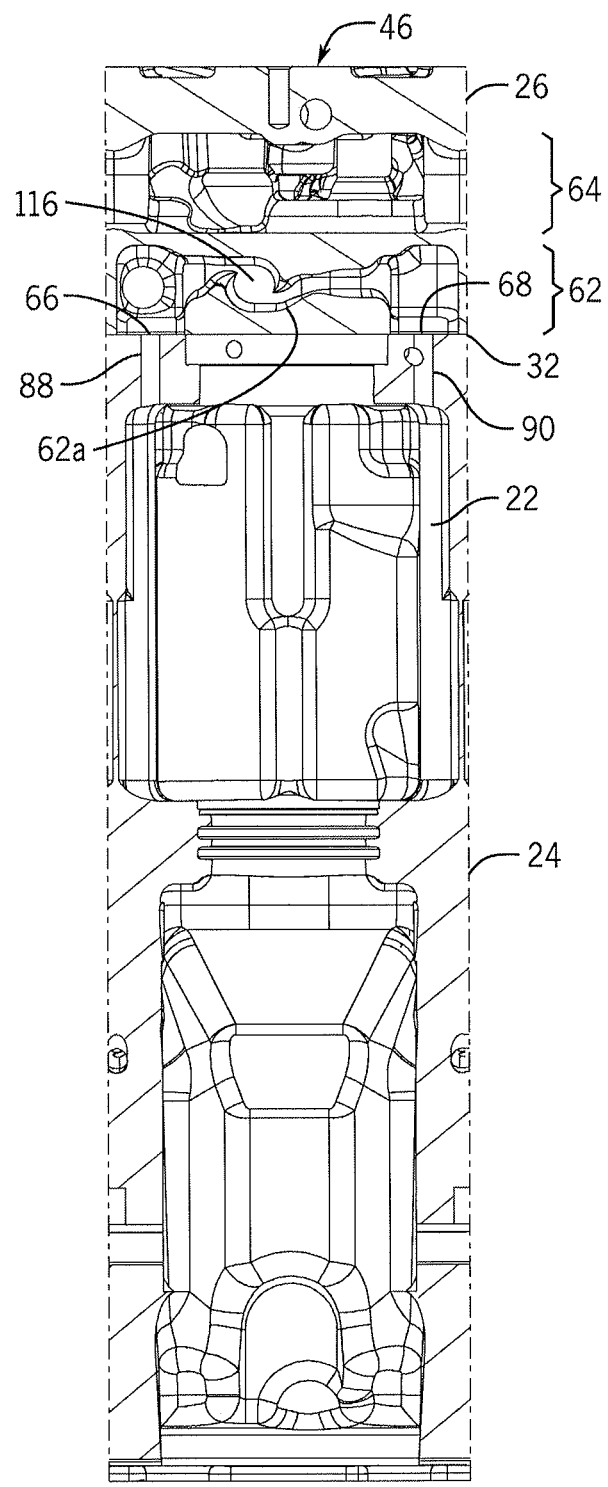
FIG. 6 is a partial cross-sectional view of a cylinder of the engine as taken along line 6-6 of FIG. 2.

In one embodiment, engine coolant may be provided to a portion of the cooling jacket 60 via orifices 66, 68, 70 and 72. With reference to FIG. 6, it may be seen that orifice 66 may be in communication with a first source passage 88, while orifice 68 may be in communication with a second source passage 90. Both the first source passage 88 and second source passage 90 may be formed (e.g., cast) at least partially within engine block 24. Moreover, with reference to FIGS. 12 and 13, it may be seen that orifice 70 may be in communication with a third source passage 92, while orifice 72 may be in communication with a fourth source passage 94. Both the third source passage 92 and fourth source passage 94 may be formed at least partially within engine block 24. In one aspect, source passages 88-94 may be part of, or in communication with a portion of cooling jacket 60 formed in engine block 24 for cooling components of engine 20 proximate to cylinders 22.

After entering orifices 66, 68, 70 and 72, engine coolant may flow into the lower deck 62 of the cooling jacket 60 via nodes 67, 69, 71 and 73. In one aspect, orifice 66 may be open to, and in fluid communication with, node 67 as illustrated at least in FIG. 9. Similarly, orifice 68, orifice 70 and orifice 72 may be open to and in fluid communication with node 69, node 71 and node 73, respectively. In one aspect, nodes 67, 69, 71 and 73 may be spaced apart about peripheral passage 76 to define one or more segments of peripheral passage 76. In particular, a segment 62a of peripheral passage 76 extends between node 67 and node 69, a segment 62b extends between node 69 and node 71, a segment 62c extends between node 71 and node 73, and a segment 62d extends between node 73 and node 69. From nodes 67, 69, 71 and 73, engine coolant may flow around peripheral passage 76 via segments 62a-d to the central passage 74 via bridge passages 78, 80 and 82.

From the central passage 74, the engine coolant may flow to the upper deck 64, into the first section 84 and onto the collection chamber 86. Engine coolant may pass between collection chambers 86 associated with adjacent cylinders 22 as shown in FIG. 11. Accordingly, adjacent collection chambers 86 may collectively form a collection log 96 through which engine coolant may flow in order to pass to a downstream portion of a cooling system. For example, collection log 96 may include an outlet 98 formed in the cylinder head 26. The outlet 98 may be in communication with a hose, line or other fluid passage for guiding engine coolant to, for example, a radiator or another component of a cooling system. Other fluid ports (e.g., inlets, outlets), such as ports 100 may be in communication with collection log 96 or another portion of cooling jacket 60.

Tuning now to FIGS. 12-17, turbulence generating features of a cooling jacket 60 according to the present disclosure will be described in greater detail. In one embodiment, a typical flow passage may include a generally uniform profile in an axial direction of the flow passage (i.e., in the general direction of fluid flow through a passage). For example, FIG. 12A illustrates a portion of a prior art cooling jacket 60'. In particular, FIG. 12A illustrates a segment 62c' of a lower deck 62' which may correspond generally to a segment 62c of lower deck 62, which extends approximately from node 71 to node 73 as shown in FIG. 9. Segment 62c' includes an upper wall 102' and an opposed lower wall 104'. A central portion 106' of segment 62c' is located proximate to a bridge passage 80'. Engine coolant flowing from a first source passage 92' may enter central portion 62c' through orifice 70' and mix with engine coolant flowing from a second source passage 94' through orifice 70' into segment 62c'. Thereafter combined engine fluid from the first source passage 92' and the second source passage 94' may travel from the central portion 106' into bridge passage 80'.

In one aspect, the cross-sectional profile of upper wall 102' as viewed in FIG. 12A is generally parallel with lower wall 104' within and adjacent to central portion 106'. Accordingly, the design of segment 62c' enables engine coolant to flow into bridge passage 80' with no specific effort made to effect a particular fluid flow pattern within central portion 106' or at a downstream location (e.g., within bridge passage 80'). By comparison, and with reference to FIG. 12, central portion 106 of segment 62c has an "S" or scroll-shaped cross-sectional profile. In one aspect, central portion 106 defines a turbulence chamber 108 for imparting a swirling action or vortical flow pattern to engine coolant passing therethrough as indicated by the arrows in FIG. 12. The turbulence chamber 108 may have a curved cross-section about a chamber axis $C_1$ (as shown in FIG. 9 and as indicated by the crosshairs in FIGS. 12, 13 and 14). In one aspect, the chamber axis $C_1$ may intersect with a centerline, $L_{C1}$ of the turbulence chamber 108.

Figure 12:
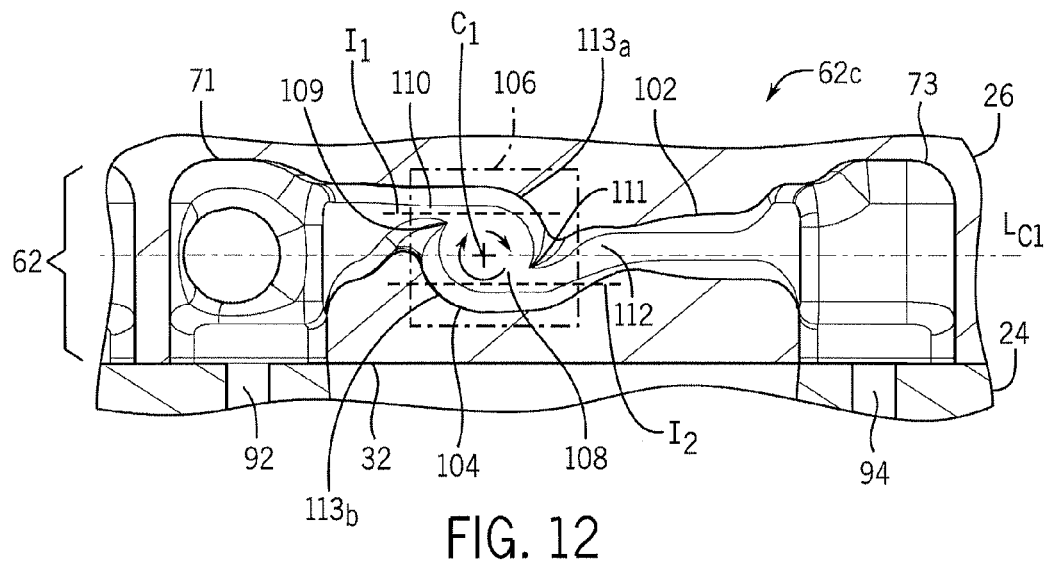
FIG. 12 is a partial cross-sectional view of a segment of the lower deck according to the present disclosure as taken along line 12-12 of FIG. 10.
Figure 12A:
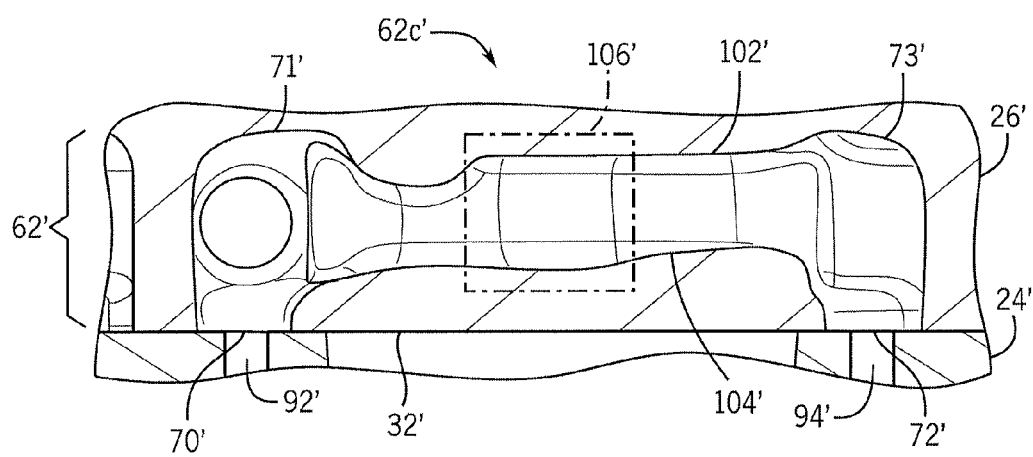
FIG. 12A is a partial cross-sectional view of a segment of the lower deck of a prior art cooling jacket.

With continued reference to FIG. 12, a first passageway 110 of segment 62c extends from node 71 and intersects the turbulence chamber 108 at a first angular position between about 10 and about 12 o'clock. The intersection of the first passageway 110 with the turbulence chamber 108 may define a first inlet opening 109. The inlet opening 109 may be positioned about a first inlet flow axis $I_1$ of the turbulence chamber 108. Similarly, a second passageway 112 of segment 62c extends from node 73 and intersects the turbulence chamber 108 at a second angular position between about 4 and about 6 o'clock. The intersection of the second passageway 112 with the turbulence chamber 108 may define a second inlet opening 111. The second inlet opening 111 may be positioned about a second inlet flow axis $I_2$. In some embodiments, the first angular position may be opposed to the second angular position. In one example, the first angular position and second angular position may be between about 150 and about 210 degrees apart. In another example, the first angular position and second angular position may be about 180 degrees apart.

Figure 13:
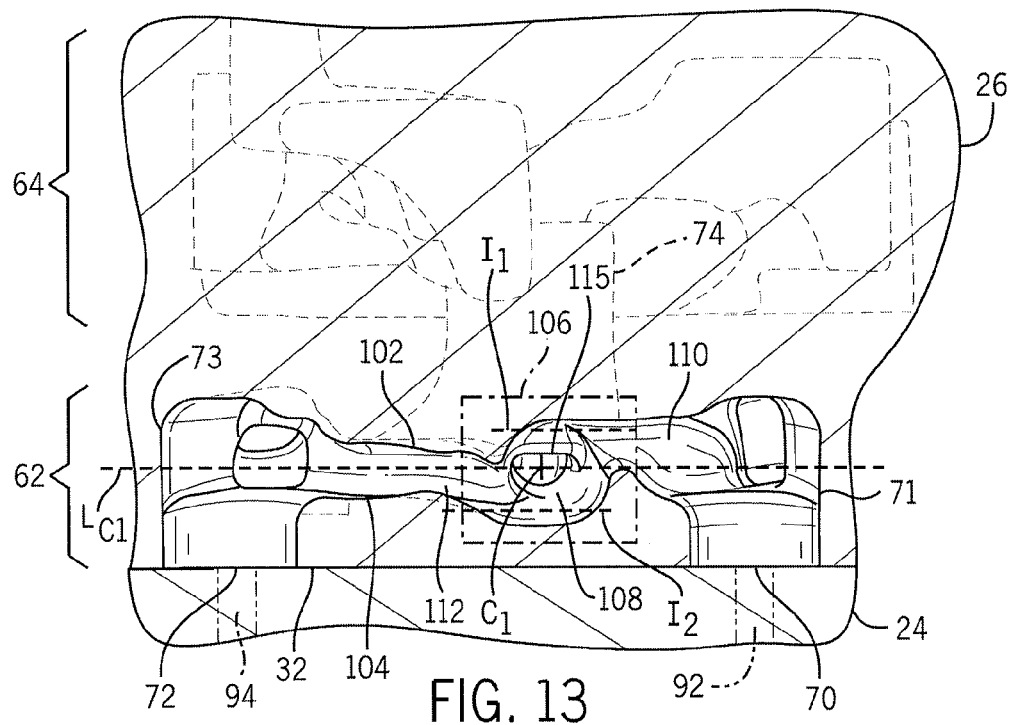
FIG. 13 is an alternative partial cross-sectional view of the segment of FIG. 12 as taken along line 13-13 of FIG. 10.
Figure 13A:
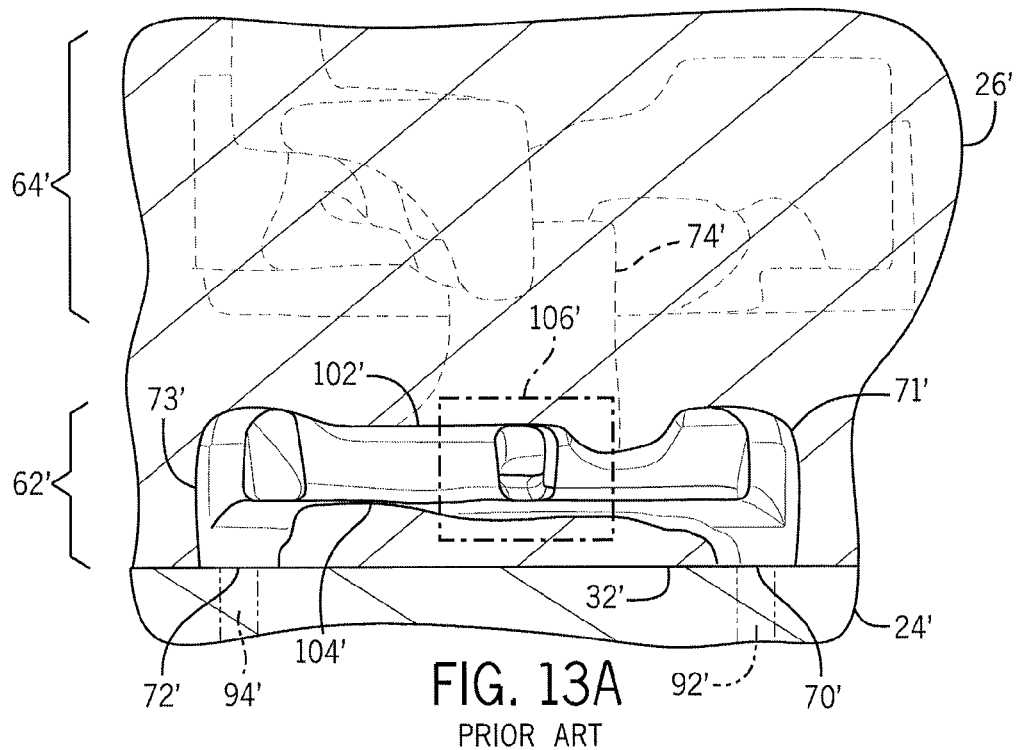
FIG. 13A is an alternative partial cross-sectional view of the prior art segment of FIG. 12A.
Figure 14:
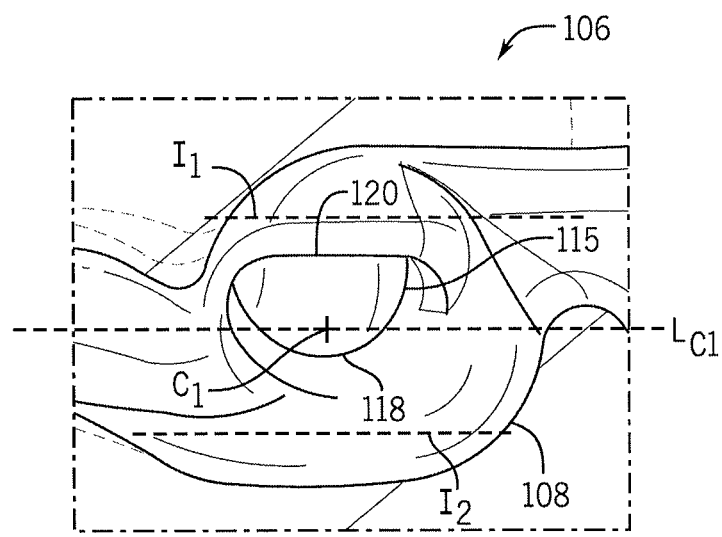
FIG. 14 is an enlarged view of the central portion of FIG. 13.

In some embodiments, at least one of the first inlet flow axis and the second inlet flow axis is orthogonal to a plane of the chamber axis. Accordingly, at least one of the first inlet flow axis $I_1$ and the second inlet flow axis $I_2$ may or may not intersect with the chamber axis $C_1$. For example, FIGS. 12, 13 and 14 illustrate that the first inlet flow axis $I_1$ is spaced apart from the second inlet flow axis $I_2$ on opposing sides of the centerline $L_{C1}$ of the turbulence chamber 108. In some embodiments, the first inlet flow axis $I_1$ may or may not be parallel to or in the same plane as the second inlet flow axis $I_2$. Moreover, the first inlet flow axis $I_1$ and the second inlet flow axis $I_2$ may or may not be parallel to or in the same plane as the centerline $L_{C1}$.

The upper wall 102 and the lower wall 104 of segment 62c may provide one or more deflection surfaces for redirecting a fluid media passing through turbulence chamber 108. For example, a portion of upper wall 102 may provide a deflection surface 113a spaced apart from the first inlet opening 109. The first inlet opening 109 and at least a portion of the deflection surface 113a may be spaced apart on opposite sides of the chamber axis $C_1$ along the first inlet flow axis $I_1$. Accordingly, fluid media entering the turbulence chamber 108 through the inlet opening 109 is redirected by the portion of the deflection surface 113a within the turbulence chamber 108 along a path at an angle to the inlet flow axis $I_1$ such that a swirling action is imparted to the fluid media exiting the turbulence chamber 108 through an outlet opening 115 located generally at the intersection between the turbulence chamber 108 and the bridge passage 80. In one aspect, the outlet opening 115 may be located about the chamber axis $C_1$. By comparison, a portion of lower wall 104 may provide a deflection surface 113b spaced apart from the second inlet opening 111. Accordingly, fluid media entering the turbulence chamber 108 through the inlet opening is redirected by the portion of the deflection surface 113b within the turbulence chamber 108 along a path at an angle to the inlet flow axis $I_2$ such that a swirling action is imparted to the fluid media exiting the turbulence chamber 108 through the outlet opening 115.

In some embodiments, a first coolant stream may flow through the first passageway 110 and through the first inlet opening 109 into the turbulence chamber 108 along the inlet flow axis $I_1$ from a first direction. A second coolant stream may flow through the second passageway 112 and through the second inlet opening 111 into the turbulence chamber 108 along the inlet flow axis $I_2$ from a second direction. The location of the turbulence chamber 108 at the confluence of the first and second coolant streams may impart a swirling action or vortical flow pattern to the coolant or other fluid media. Accordingly, to provide opposing coolant flows into the turbulence chamber 108, a first source of engine coolant may be provided to the first passageway 110 via orifice 70 and node 71. Moreover, a second source of engine coolant may be provided to the second passageway 112 via orifice 72 and node 73.

In general, a cooling jacket according to the present disclosure may enable a flow pattern for a fluid media to be generated at a given location within the cooling jacket and then translated to a second location within the cooling jacket. For example, one or more fluid stream passing through an inlet opening into a turbulence chamber along an inlet flow axis may be guided by one or more deflection surfaces within the turbulence chamber to impart a swirling action to the fluid media. The swirling action may be about a chamber axis of the turbulence chamber. The design of the turbulence chamber may further include an outlet opening positioned about the chamber axis. Accordingly, the fluid media imparted with the swirling action may be guided along the chamber axis through the outlet opening in the turbulence chamber. The fluid media may therefore retain the swirling action at a downstream location within the cooling jacket.

In some embodiments, an inlet flow axis may intersect a plane of the chamber axis such that the inlet flow axis is orthogonal to the plane as shown, for example, in the figures illustrated herein. The orthogonal arrangement of the inlet flow axis and the plane of the chamber axis may enable fluid to flow out of the turbulence chamber at right angle to the direction of flow into the chamber. Moreover, the swirling action imparted to the fluid media may be transmitted along the axis that it is formed about. By comparison, other embodiments of a cooling jacket may include an outlet opening positioned about an outlet flow axis different from the chamber axis. In one example, the outlet flow axis may be orthogonal to a plane of the chamber axis. In contrast to the previous example, a fluid media imparted with a swirling action may flow out of a turbulence chamber at an angle to the axis that the swirling action is formed about. However, the inlet flow axis and the outlet flow axis may or may not be parallel or co-planar. Other arrangements of a cooling jacket where a fluid media is imparted with a particular flow pattern that is then translated to a downstream location may also fall within the scope of the present disclosure.

With continued reference to FIGS. 12, 13 and 14, it may be useful to provide turbulence chamber 108 to impart a swirling action locally, such as within the turbulence chamber 108, or globally, such as at a point downstream from the turbulence chamber 108. As shown at least in FIGS. 8 and 9, turbulence chamber 108 of segment 62c is located proximate to bridge passage 80. In one aspect, bridge passage 80 may be immediately downstream of outlet opening 115. Therefore, coolant streams may flow into the turbulence chamber 108 along the first inlet flow axis $I_1$ and second inlet flow axis $I_2$ and through the outlet opening into bridge passage 80. It will be appreciated that in embodiments in which the first inlet flow axis $I_1$ and second inlet flow axis $I_2$ are positioned at an angle $\alpha_1$ (see FIG. 9) to a plane of the chamber axis $C_1$, a swirling action may be imparted to the coolant streams combined in turbulence chamber 108 and the swirling action may be retained as the fluid media travels at an angle into bridge passage 80. In one aspect, the angle $\alpha$, between at least one of the first inlet flow axis $I_1$ and second inlet flow axis $I_2$ and the plane of the chamber axis $C_1$ may be between about 60 degrees and about 120 degrees. In another aspect, the angle $\alpha_1$ may be a right angle (i.e., about 90 degrees).

In one aspect, a swirling action may provide enhanced heat transfer for components of engine 20 proximate to bridge passage 80. For example, bridge passage 80 is disposed between second intake port 36 and second exhaust port 40. Accordingly, turbulence chamber 108 is positioned proximate bridge section 80 to impart a swirling action to coolant passing through bridge section 80 and provide enhanced heat transfer to portions of cylinder head 26 proximate second intake port 36 and second exhaust port 40.

FIGS. 8 and 9, at least, illustrate that a lower deck 62 may include more than one turbulence inducing element. In one aspect, segment 62d may include a turbulence chamber 114 proximate bridge section 78 and segment 62a may include a turbulence chamber 116 proximate bridge section 82. Turbulence chamber 114 may impart a swirling action to coolant passing through bridge section 78 and provide enhanced heat transfer to portions of cylinder head 26 proximate first exhaust port 38 and second exhaust port 40. Moreover, turbulence chamber 116 may impart a swirling action to coolant passing through bridge section 82 and provide enhanced heat transfer to portions of cylinder head 26 proximate second exhaust port 40 and first intake port 34. The swirling action may raise both the peak heat transfer rate and creates higher heat transfer over a larger area.

With respect to turbulence chamber 114, a swirling action may be imparted to fluid media exiting through an outlet opening 117 in fluid communication with the bridge passage 78. Similarly, turbulence chamber 116 may impart a swirling action to fluid media exiting through an outlet opening 119 in fluid communication with the bridge passage 82. In the example case of segment 62d, coolant streams may flow into the turbulence chamber 114 along the third inlet flow axes $I_3$ and the fourth inlet flow axis $I_4$, and through the outlet opening 117 into bridge passage 78. It will be appreciated that in embodiments in which the third inlet flow axis $I_3$ and the fourth inlet flow axis $I_4$ are positioned at an angle $\alpha_2$ to the plane of the chamber axis $C_2$, a swirling action may be imparted to the coolant streams combined in turbulence chamber 114 and the swirling action may be retained as the fluid media travels at an angle into bridge passage 78. In one aspect, the chamber axis $C_2$ may be spaced apart from at least one of the third inlet flow axis $I_3$ and the fourth inlet flow axis $I_4$. In another aspect, the angle $\alpha_2$ between at least one of the third inlet flow axes $I_3$ and the fourth inlet flow axis $I_4$ and the plane of the chamber axis $C_2$ may be between about 60 degrees and about 120 degrees. In yet another aspect, the angle $\alpha_2$ may be a right angle (i.e., about 90 degrees).

Figure 14A:
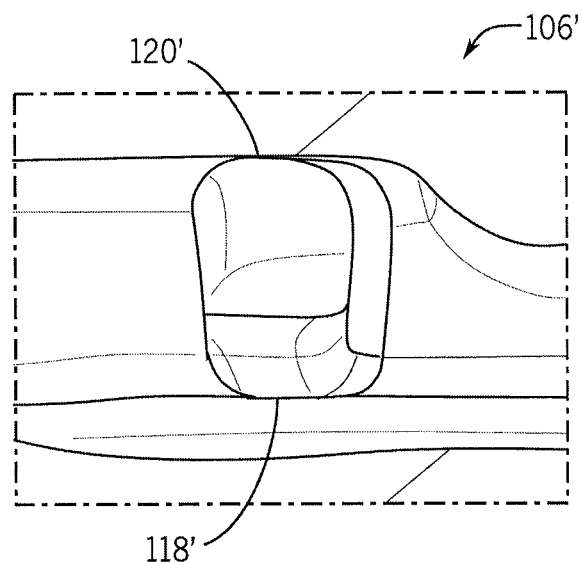
FIG. 14A is an enlarged view of the prior art central portion of FIG. 13A.

Tuning now to FIGS. 13-17, the cooling jacket 60 may include one or more additional (or alternative) turbulence inducing features. As discussed with respect to FIG. 12A, a central portion 106' of a segment 62c' may be positioned proximate to and in fluid communication with a bridge passage 80'. The bridge passage 80' may have a generally uniform, rectangular cross-section as viewed in FIG. 14A. Similarly, a central portion 107' of a segment 62d' may be positioned proximate to and in fluid communication with a bridge passage 78'. The bridge passage 78' may have a generally uniform, rectangular cross-section as viewed in FIGS. 15A-17A. Bridge passage 78' extends with a generally uniform cross-section towards central passage 74' from a point of intersection with segment 62d' proximate central portion 107'. A lower wall 122' of bridge passage 78' then tapers slightly inward towards an opposed upper wall 124' prior to intersecting with central passageway 74'. Accordingly, the design of bridge passages 78' and 80' enables engine coolant to flow into central passage 74' with no specific effort made to affect a particular fluid flow pattern within bridge passages 78' and 80' or at a downstream location such as within central passage 74'.

Figure 15:
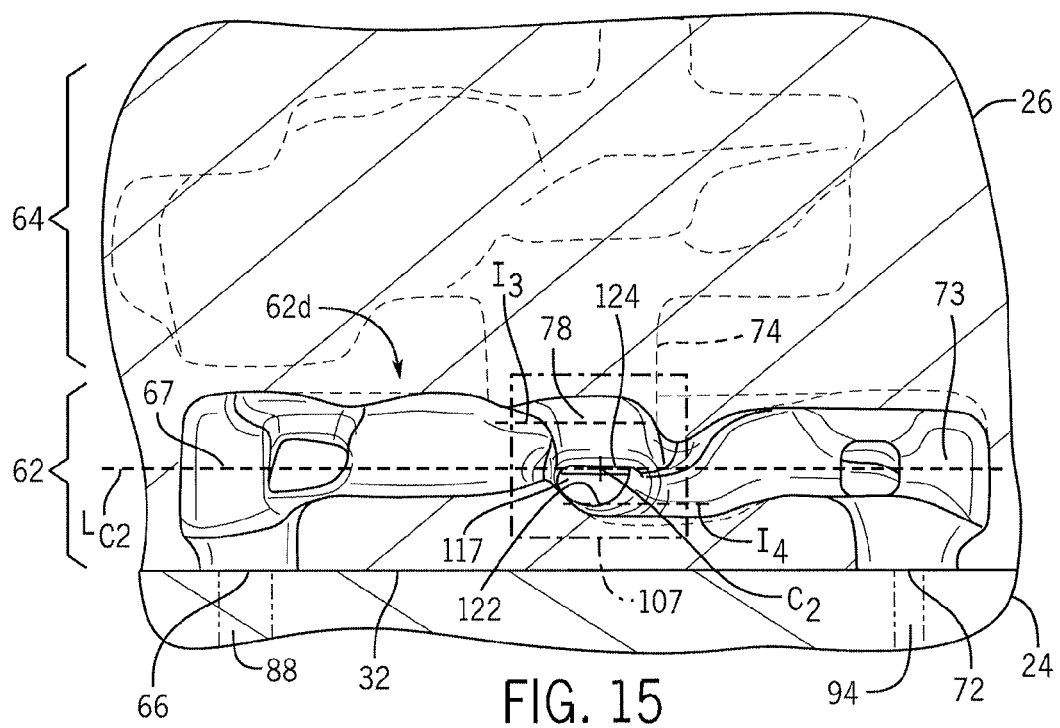
FIG. 15 is a partial cross-sectional view of another segment of the lower deck according to the present disclosure as taken along line 15-15 of FIG. 10.
Figure 15A:
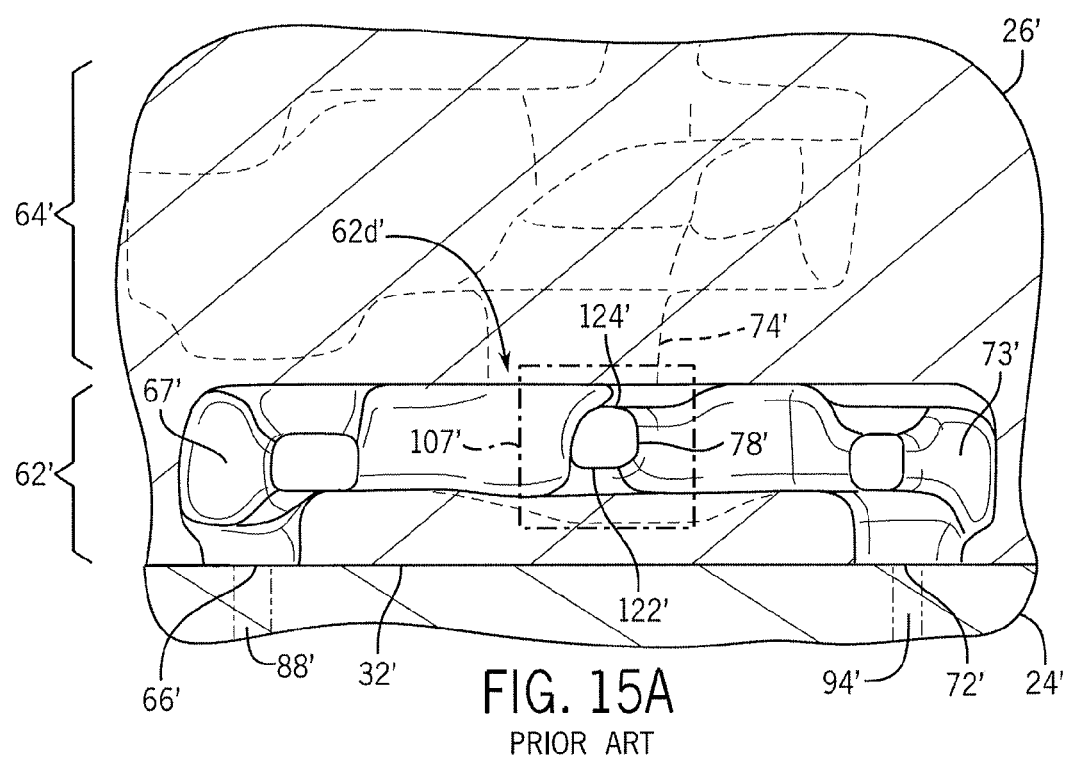
FIG. 15A is a partial cross-sectional view of another segment of the lower deck of a prior art cooling jacket.
Figure 16:
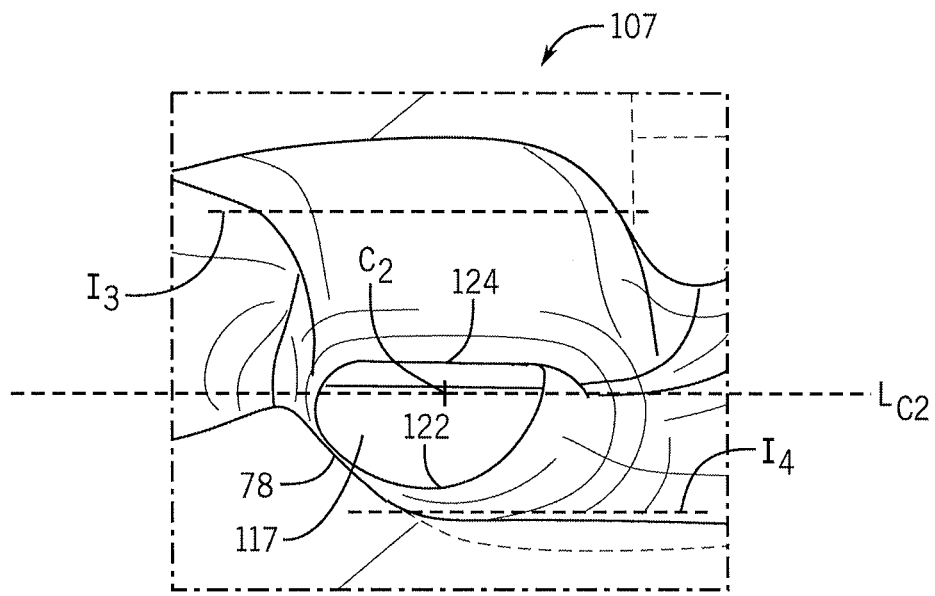
FIG. 16 is an enlarged view of the central portion of FIG. 15.
Figure 16A:
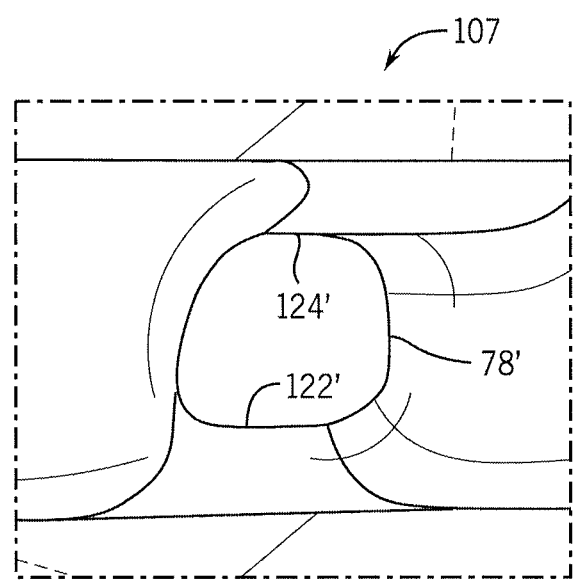
FIG. 16A is an enlarged view of the prior art central portion of FIG. 15A.

By comparison, and with reference to FIGS. 13 and 14, bridge passage 80 may have a non-rectangular radial cross-section. In particular, FIG. 14 illustrates that bridge passage 80 may have a generally semi-circular cross-section with a lower wall 118 being generally curved and an upper wall 120 being generally planar. In another aspect, one or more of bridge passages 78-82 may additionally (or alternatively) have a non-uniform axial or longitudinal cross-section. For example, bridge passage 78 may have a non-rectangular radial cross-section as shown in FIGS. 15 and 16. In particular, FIG. 16 illustrates that bridge passage 78 may have a generally semi-circular cross-section with a lower wall 122 being generally curved and an upper wall 124 being generally planar.

In some embodiments, the minimum height of the radial cross-section of bridge passage 78 may be between about 5 mm and about 15 mm, while the minimum width of the radial cross-section of bridge passage 78 may be between about 10 mm and about 25 mm. For example, the minimum height of the radial cross-section of bridge passage 78 may be about 9 mm, and the minimum width of the radial cross-section of bridge passage 78 may be about 17 mm.

Figure 17:
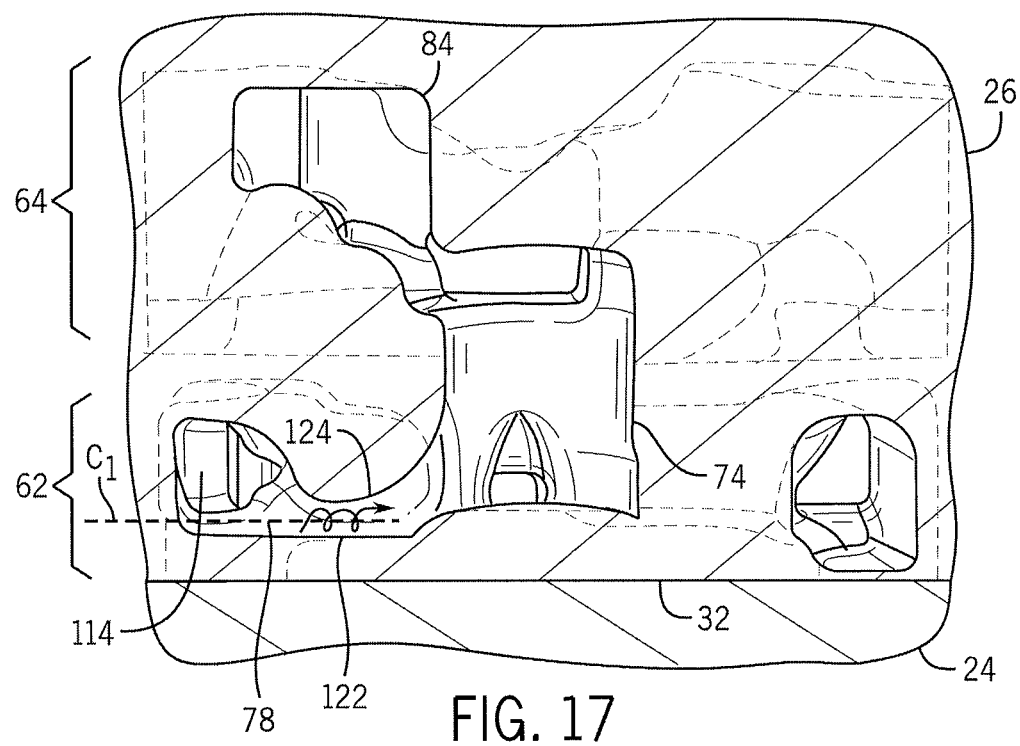
FIG. 17 is a partial cross-sectional view of a bridge passage of the lower deck according to the present disclosure as taken along line 17-17 of FIG. 10.
Figure 17A:
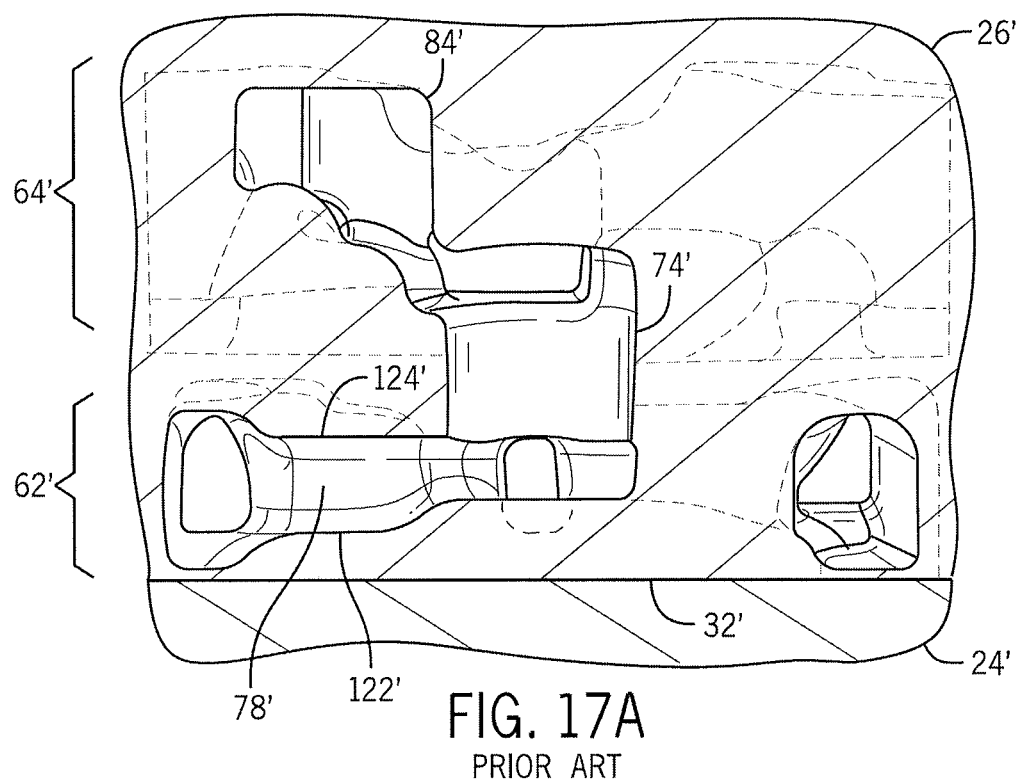
FIG. 17A is partial cross-sectional view of a bridge passage of the lower deck of a prior art cooling jacket.

With reference to FIG. 17, the lower wall 122 of bridge passage 78 may extend from segment 62*d* proximate turbulence chamber 114 and central portion 107 with a generally linear or flat profile. As bridge passage 78 approaches central passage 74, lower wall 122 may curve upwards with a concave profile to intersect with central passage 74. Upper wall 124 may curve downwards with a convex profile towards lower wall 122 as upper wall 124 extends away from segment 62*d* proximate turbulence chamber 114. Thereafter, upper wall 124 may curve upwards with a concave profile to intersect with central passage 74. Accordingly, upper wall 124 may have a generally "U"-shaped cross-sectional profile.

The overall three-dimensional configuration of bridge passages 78-82 as viewed at least in FIGS. 13-17 may generally enhance heat transfer from components proximate to the bridge passages 78-82, create additional flow dynamics within or downstream of bridge passages 78-82, or increase the peak heat transfer rate that may be achieved with the cooling jacket 60. In one aspect, the three-dimensional configuration of bridge passages 78-82 may increase the overall turbulence of a coolant flowing therethrough, increase the turbulence of a coolant at a particular point in the bridge passage, or provide a more uniform turbulence profile. In another aspect, the design bridge passages 78-82 may guide a fluid towards a certain location such as towards lower wall 118 or lower wall 122. In yet another aspect, the bridge passages 78-82 may impart a particular flow pattern such as a swirling action, vortical flow as indicated by the arrow in FIG. 17. Moreover, in some embodiments, one or more of bridge passages 78-82 may be configured to harmonize or synergize with turbulence chambers 108, 114 or 116 in order to maintain (or maximize retention of) a swirling action imparted to a coolant flowing from a respective one of turbulence chambers 108, 114 and 116 into a respective one of bridge passages 78-82.

In some embodiments, one or more aspects of the cooling jacket 60 or engine 20 as described with reference to the figures may be varied. For example, whereas lower deck 62 includes four orifices 66, 68, 70 and 72, a lower deck may be designed with fewer orifices. A design with fewer orifices may be useful if fewer than four sources of engine coolant are provided to a lower deck of a cooling jacket. In another example, as compared with the cooling jacket 60, other embodiments of a cooling jacket may be designed with a single deck or more than two decks. In yet another example, the general direction of flow may be varied from the flow pattern illustrated in the figures. In one aspect, the flow direction may be reversed with engine coolant passing from an upper deck to a lower deck of a cooling jacket positioned within a cylinder head. Thereafter, the engine coolant may flow from the cylinder head to the engine block. In another aspect, the engine coolant may be provided at an intermediate location such as near the interface of the cylinder head and engine block with engine coolant generally flowing in opposed or divergent directions.

In some embodiments, a turbulence chamber may include only one inlet opening for receiving a fluid media therein. As in the case of the examples shown in the figures, a turbulence chamber may be disposed about a chamber axis. The turbulence chamber may have an interior deflection surface and an inlet opening at a first angular position about the chamber axis. The inlet opening and at least a portion of the deflection surface may be spaced apart on opposite sides of the chamber axis along an inlet flow axis spaced from the chamber axis. An outlet opening may be positioned along the chamber axis and in communication with a bridge passage. A fluid media may be provided to the turbulence chamber through the inlet opening and redirected by the portion of the deflection surface within the turbulence chamber along a path at an angle to the inlet flow axis such that a swirling action is imparted to the fluid media exiting the turbulence chamber through the outlet opening.

As also described herein, an inlet flow axis may be spaced apart from a chamber axis of the turbulence chamber. Moreover, the inlet flow axis may be positioned at angle to the chamber axis. In one aspect, the angle may be between about 60 degrees and about 120 degrees. In another aspect, the angle may be between about 90 degrees, or a right angle. Even through the turbulence chamber is provided with a single source of fluid media from a single inlet, a swirling action may be imparted to the fluid media passing therethrough. Moreover, the swirling action may be at least partially retained by the fluid media in the outlet (bridge) passage after exiting the turbulence chamber through the outlet opening.

In summary, embodiments of a cooling jacket according to the present disclosure may allow additional power growth for a given engine design by enhancing heat transfer between a coolant flowing through cooling jacket formed at least partially within a cylinder head. More broadly, the three-dimensional configuration of portions of a cooling jacket as described herein may be included in the design of heat transfer systems in general.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. In an engine having an engine block and a cylinder head mounted on the engine block defining one or more piston cylinders and one or more intake and exhaust ports in communication with each piston cylinder, a cooling jacket formed at least in part within the head, comprising:
a plurality of turbulence chambers spaced apart about the one or more intake and exhaust ports, each turbulence chamber having a chamber axis and being disposed about its respective chamber axis, each turbulence chamber having a first inlet opening that opens about a first inlet flow axis at a first angular position relative to the respective chamber axis, a second inlet opening that opens about a second inlet flow axis at a second angular position relative to the respective chamber axis different from the first angular position, and an outlet opening positioned about the respective chamber axis, wherein each first inlet flow axis is spaced apart from the respective second inlet flow axis on opposing sides of a centerline of the respective turbulence chamber that intersects the respective chamber axis;
wherein each turbulence chamber is intersected by a first flow passage at the respective first inlet opening and a second flow passage at the respective second inlet opening;
whereby at each turbulence chamber a swirling action is imparted to fluid media exiting the respective outlet opening.

2. The cooling jacket of claim 1, wherein each first flow passage is a first coolant inlet and each second flow passage is a second coolant inlet, and wherein a first coolant stream from the respective first coolant inlet flows into the respective turbulence chamber from a first direction and a second coolant stream from the respective second coolant inlet flows into the respective turbulence chamber from a second direction.

3. The cooling jacket of claim 1, wherein each first inlet flow axis and each second inlet flow axis is are orthogonal to a plane of the respective chamber axis.

4. The cooling jacket of claim 1, further including a lower deck proximate the piston cylinders and an upper deck in communication with the lower deck; and
wherein the lower deck includes the turbulence chambers.

5. The cooling jacket of claim 1, further including:
a first exhaust port and a second exhaust port positioned on a first side of a central passage;
a first intake port and a second intake port positioned on a second side of the central passage and opposed to the first side;
a peripheral passage disposed around the central passage and circumscribing the first exhaust port, the second exhaust port, the first intake port, and the second intake port; and
at least one bridge passage extending between the central passage and the peripheral passage;
wherein the plurality of turbulence chambers is formed within the peripheral passage.

6. The cooling jacket of claim 5, wherein the plurality of turbulence chambers includes a first turbulence chamber, a second turbulence chamber and a third turbulence chamber, wherein the first turbulence chamber is in fluid communication with the central passage via a first bridge passage positioned intermediate the first exhaust port and the second exhaust port, wherein the second turbulence chamber is in fluid communication with the central passage via a second bridge passage positioned intermediate the first exhaust port and the second intake port, and wherein the third turbulence chamber is in fluid communication with the central passage via a third bridge passage positioned intermediate the second exhaust port and the first intake port.

7. The cooling jacket of claim 6, wherein at least one of the first, second and third bridge passages includes a generally U-shaped cross-sectional profile.

8. The cooling jacket of claim 5, wherein the peripheral passage includes at least one orifice in fluid communication with a source of engine coolant.

9. A work vehicle, comprising:
an engine having an engine block and a cylinder head mounted on the engine block defining one or more piston cylinders and one or more intake and exhaust ports in communication with each piston cylinder; and
a cooling jacket formed at least in part within the head including a plurality of turbulence chambers spaced apart about the one or more intake and exhaust ports, each turbulence chamber having a chamber axis and being disposed about its respective chamber axis, each turbulence chamber having a first inlet opening that opens about a first inlet flow axis at a first angular position relative to the respective chamber axis, a second inlet opening that opens about a second inlet flow axis at a second angular position relative to the respective chamber axis different from the first angular position, and an outlet opening positioned about the respective chamber axis, wherein each first inlet flow axis is spaced apart from the respective second inlet flow axis on opposing sides of a centerline of the respective turbulence chamber that intersects the respective chamber axis;
wherein each turbulence chamber is intersected by a first flow passage at the respective first inlet opening and a second flow passage at the respective second inlet opening;
whereby at each turbulence chamber a swirling action is imparted to fluid media passing therethrough.

10. The vehicle of claim 9, wherein the first flow passage is a first coolant inlet and the second flow passage is a second coolant inlet, and
wherein a first coolant stream from the respective first coolant inlet flows into the respective turbulence chamber from a first direction and a second coolant stream from the respective second coolant inlet flows into the respective turbulence chamber from a second direction.

11. The vehicle of claim 10, wherein each turbulence chamber has a curved cross-section about the respective chamber axis extending within a plane intersecting the respective first and second coolant inlets.

12. The cooling jacket of claim 9, wherein each first inlet flow axis and each second inlet flow axis are orthogonal to a plane of the respective chamber axis.

13. The cooling jacket of claim 9, further including:
a first exhaust port and a second exhaust port positioned on a first side of a central passage;
a first intake port and a second intake port positioned on a second side of the central passage and opposed to the first side;
a peripheral passage disposed around the central passage and circumscribing the first exhaust port, the second exhaust port, the first intake port, and the second intake port; and
at least one bridge passage extending between the central passage and the peripheral passage;

wherein the plurality of turbulence chambers is formed within the peripheral passage.

14. The cooling jacket of claim 13, wherein the plurality of turbulence chambers includes a first turbulence chamber, a second turbulence chamber and a third turbulence chamber, wherein the first turbulence chamber is in fluid communication with the central passage via a first bridge passage positioned intermediate the first exhaust port and the second exhaust port, wherein the second turbulence chamber is in fluid communication with the central passage via a second bridge passage positioned intermediate the first exhaust port and the second intake port, and wherein the third turbulence chamber is in fluid communication with the central passage via a third bridge passage positioned intermediate the second exhaust port and the first intake port.

15. In an engine having an engine block and a cylinder head mounted on the engine block defining one or more piston cylinders and one or more intake and exhaust ports in communication with each piston cylinder, a cooling jacket formed at least in part within the head, comprising:
- a plurality of turbulence chambers spaced apart about the one or more intake and exhaust ports, each turbulence chamber having a chamber axis and being disposed about its respective chamber axis, each turbulence chamber having:
- an interior deflection surface;
- an inlet opening at a first angular position about the respective chamber axis, the inlet opening and at least a portion of the deflection surface being spaced apart on opposite sides of the respective chamber axis along an inlet flow axis spaced from the respective chamber axis; and
- an outlet opening positioned about the respective chamber axis;
- a plurality of inlet passageways providing fluid media to the turbulence chambers through the inlet openings; and
- a plurality of outlet passageways receiving fluid media from the turbulence chambers through the outlet openings;
- wherein fluid media entering each turbulence chamber through the respective inlet opening is redirected by the portion of the respective deflection surface within the respective turbulence chamber along a path at an angle to the respective inlet flow axis such that a swirling action is imparted to the fluid media exiting the respective turbulence chamber through the respective outlet opening.

16. The engine of claim 15, wherein each inlet flow axis is orthogonal to a plane of the respective chamber axis.

17. The engine of claim 16, wherein the swirling action is at least partially retained by the fluid media in each outlet passage after exiting the respective turbulence chamber.

* * * * *

UNITED STATES PATENT AND TRADEMARK OFFICE
CERTIFICATE OF CORRECTION

PATENT NO. : 10,001,078 B2
APPLICATION NO. : 14/493177
DATED : June 19, 2018
INVENTOR(S) : Green et al.

Page 1 of 1

It is certified that error appears in the above-identified patent and that said Letters Patent is hereby corrected as shown below:

On the Title Page

Item (72), Column 1, in "Inventors", Line 2, after "Richard" delete "R." and insert -- E. --, therefor.

Item (72), Column 1, in "Inventors", Line 6, after "Clifford" insert -- N. --.

Item (74), Column 2, in "Attorney, Agent, or Firm", Line 1, delete "Kopf." and insert -- Kopf, --, therefor.

In the Claims

In Column 15, in Claim 3, Line 40, delete "is are" and insert -- are --, therefor.

Signed and Sealed this
Twenty-fifth Day of December, 2018

Andrei Iancu
*Director of the United States Patent and Trademark Office*